United States Patent
Huang et al.

(10) Patent No.: US 11,764,698 B2
(45) Date of Patent: Sep. 19, 2023

(54) RCD BUFFER CIRCUIT FOR A RECTIFIER ON A FLYBACK SECONDARY

(71) Applicant: Silergy Semiconductor Technology (Hangzhou) LTD, Hangzhou (CN)

(72) Inventors: Qiukai Huang, Hangzhou (CN); Zhan Chen, Hangzhou (CN)

(73) Assignee: Silergy Semiconductor Technology (Hangzhou) LTD, Hangzhou (CN)

(*) Notice: Subject to any disclaimer, the term of this patent is extended or adjusted under 35 U.S.C. 154(b) by 117 days.

(21) Appl. No.: 17/332,411

(22) Filed: May 27, 2021

(65) Prior Publication Data
US 2021/0384841 A1    Dec. 9, 2021

(30) Foreign Application Priority Data

Jun. 5, 2020  (CN) .......................... 202010502913.9

(51) Int. Cl.
*H02M 3/335*     (2006.01)
(52) U.S. Cl.
CPC ............... *H02M 3/33592* (2013.01)
(58) Field of Classification Search
CPC .............................................. H02M 3/335–42
See application file for complete search history.

(56) References Cited

U.S. PATENT DOCUMENTS

| | | |
|---|---|---|
| 7,227,277 B2 | 6/2007 | Chapman et al. |
| 7,256,568 B2 | 8/2007 | Lam et al. |
| 8,310,846 B2 | 11/2012 | Piazzesi |
| 8,853,888 B2 | 10/2014 | Khaligh |
| 9,130,460 B2 | 9/2015 | Sun et al. |
| 9,257,916 B2 | 2/2016 | Cheng et al. |
| 9,543,822 B2 | 1/2017 | Hang et al. |
| 9,559,591 B2 | 1/2017 | Hang et al. |
| 10,270,354 B1* | 4/2019 | Lu .......................... H02M 1/32 |
| 2007/0052397 A1 | 3/2007 | Thompson et al. |
| 2008/0231115 A1 | 9/2008 | Cho et al. |
| 2008/0258688 A1 | 10/2008 | Hussain et al. |
| 2012/0153729 A1 | 6/2012 | Song et al. |
| 2013/0063180 A1 | 3/2013 | Sun et al. |
| 2015/0078045 A1 | 3/2015 | Zhang et al. |

(Continued)

FOREIGN PATENT DOCUMENTS

EP          0146832 A1 *    7/1985    .......... H02M 3/3385

OTHER PUBLICATIONS

Machine translation of EP 0146832 A1. "Interruption Device For a Self-oscillating Flyback Converter" by Dipling et al. Filed 1984. (Year: 1985).*

*Primary Examiner* — Peter M Novak

(57) ABSTRACT

A buffer circuit coupled in parallel to a rectifier circuit in a secondary side of a flyback converter, the buffer circuit including: a capacitive element configured to be charged by an output capacitor when a primary power switch in the flyback converter is turned on; and the capacitive element being configured to be discharged through a secondary winding of a transformer when the primary power switch is turned off, in order to reduce energy stored in a primary leakage inductor in a primary side of the flyback converter, whereby a spike voltage generated in a secondary leakage inductor in the secondary side is reduced, and efficiency of the flyback converter is improved.

7 Claims, 9 Drawing Sheets

(56) References Cited

U.S. PATENT DOCUMENTS

| | | | |
|---|---|---|---|
| 2015/0124493 A1* | 5/2015 | Fornage | H02M 3/33507 363/21.12 |
| 2016/0211745 A1 | 7/2016 | Hang et al. | |
| 2017/0063238 A1 | 3/2017 | Hang et al. | |
| 2017/0279279 A1 | 9/2017 | Shimada et al. | |
| 2018/0198361 A1 | 7/2018 | Seong et al. | |

* cited by examiner

RCD BUFFER CIRCUIT FOR A RECTIFIER ON A FLYBACK SECONDARY

RELATED APPLICATIONS

This application claims the benefit of Chinese Patent Application No. 202010502913.9, filed on Jun. 5, 2020, which is incorporated herein by reference in its entirety.

FIELD OF THE INVENTION

The present invention generally relates to the field of power electronics, and more particularly to buffer circuit and associated switching power supplies.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In order to solve the problem of a possible spike voltage generated by a leakage inductor in a secondary side of the transformer, there are two existing approaches: one is to utilize a secondary diode with higher reverse withstand voltage instead of a buffer circuit, and the other is to provide an RC buffer circuit connected in parallel with the secondary diode.

Figure 1:
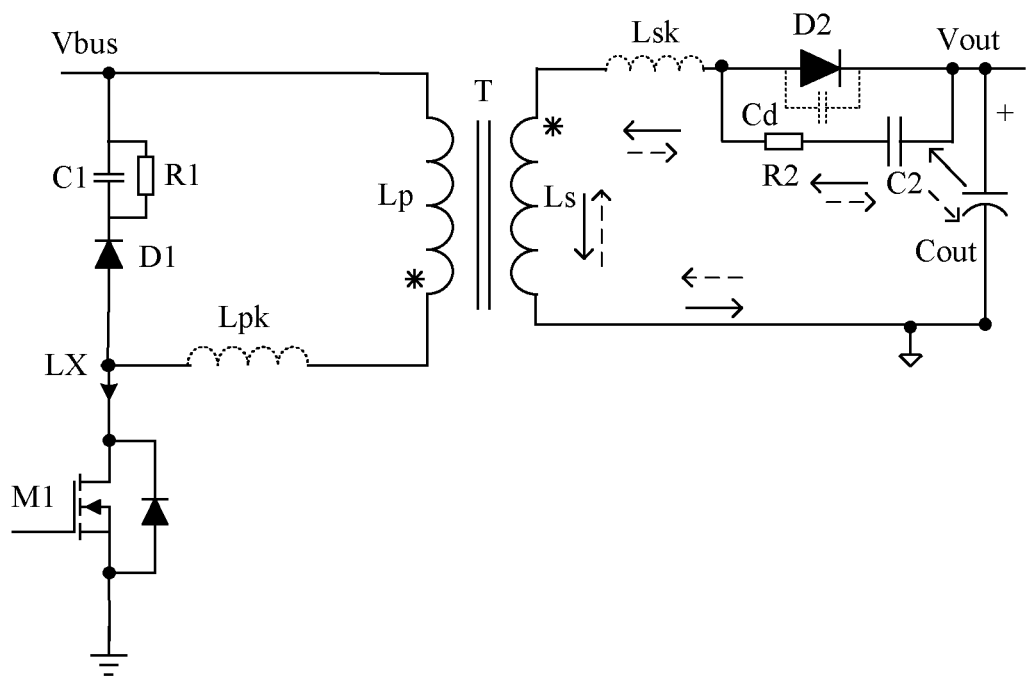
FIG. 1 is a schematic block diagram of an example switching power supply with a buffer circuit.

Referring now to FIG. 1, shown is a schematic block diagram of an example switching power supply with a buffer circuit. This example switching power supply can include primary leakage inductor Lpk in the primary side, secondary leakage inductor Lsk in the secondary side, and secondary winding Ls. The buffer circuit can include resistor R2 and capacitor C2. For adopting the method that utilizes the secondary diode with the higher reverse withstand voltage, secondary diode D2 may have an internal junction capacitance Cd. When primary power switch M1 is turned on, the voltage at node LX can decrease, the voltage at the anode of secondary diode D2 can decrease, and junction capacitor Cd may be charged by output capacitor Cout. The charging current path can be: Cout-Cd-Lsk-Ls-SGND-Cout, where SGND is the secondary reference ground.

During the charging process of junction capacitor Cd, junction capacitor Cd and secondary leakage inductor Lsk in the secondary side can be connected in series. When the voltage at node LX drops to 0 V, the voltage at the anode of secondary diode D2 may drop to (−Vbus*Ns/Np), where Vbus is the DC bus voltage, and Ns/Np is the turns ratio of the secondary and primary windings of transformer T. The voltage at the anode of secondary diode D2 can be pulled down due to the freewheeling of secondary leakage inductor Lsk, and stabilizes at (−Vbus*Ns/Np) after several cycles of oscillation. Due to the existence of secondary leakage inductor Lsk in the secondary side, secondary diode D2 may bear a higher reverse spike voltage, and the electromagnetic interference (EMI) performance of the switching power supply may deteriorate. Therefore, a diode with a higher withstand voltage in the secondary side may be selected, which can sacrifice efficiency and increase cost.

For adopting the method that utilizes the secondary diode connected in parallel with the RC buffer circuit, the capacitance of capacitor C2 can be much larger than that of junction capacitor Cd. When primary power switch M1 is turned on, capacitor C2 can be also charged. The presence of resistor R2 may dampen the series resonance of secondary leakage inductor Lsk in the secondary side, which can effectively reduce the spike voltage caused by secondary leakage inductor Lsk. However, resistor R2 may increase power consumption and reduce efficiency. Regarding the spike voltage generated in the secondary side, the disadvantages of the two approaches can include increase of the cost of the switching power supply, reduction in the efficiency of the switching power supply, and increased area of the switching power supply.

Figure 2:
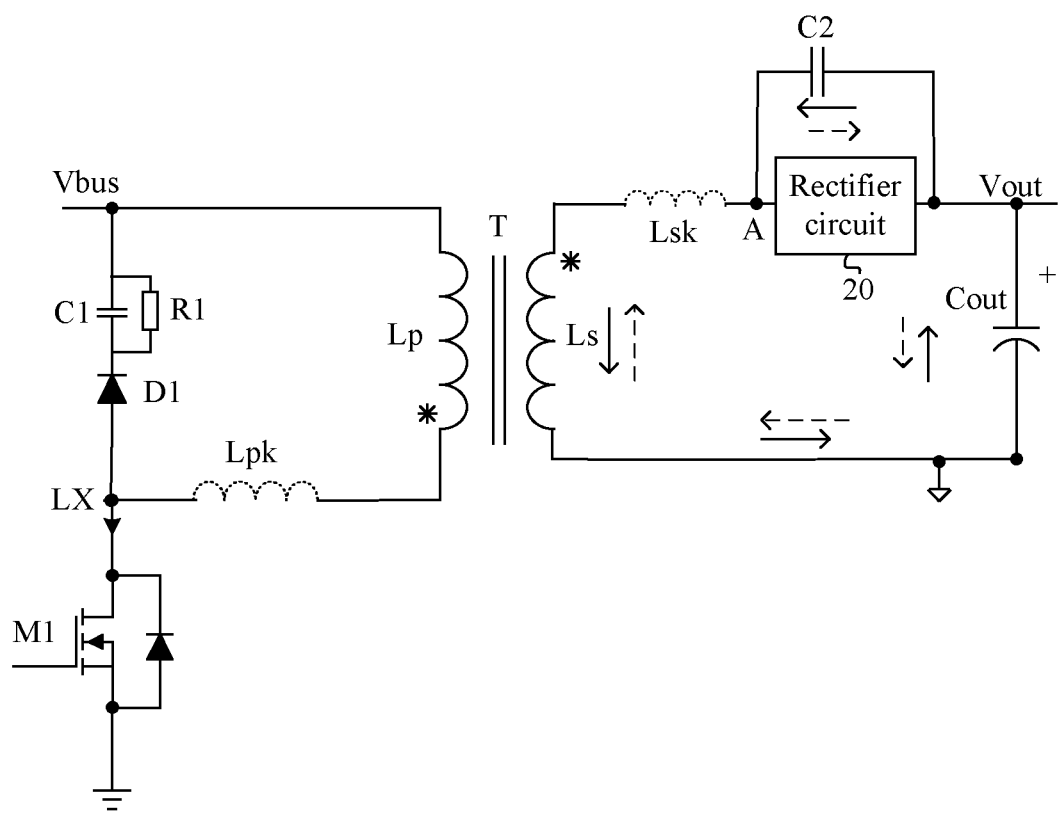
FIG. 2 is a schematic block diagram of a first example buffer circuit for a switching power supply, in accordance with embodiments of the present invention.

Referring now to FIG. 2, shown is a schematic block diagram of a first example buffer circuit for a switching power supply, in accordance with embodiments of the present invention. In this particular example, the switching power supply can include a power stage circuit and a control circuit (not shown). In this example, the power stage circuit is configured as a flyback topology, and can include primary winding Lp and primary power switch M1 connected in series between input terminal Vbus and a primary reference ground, secondary winding Ls coupled with primary winding Lp, and rectifier circuit 20 connected with secondary winding Ls.

In this example, rectifier circuit 20 is configured as a secondary diode or a synchronous rectifier circuit. In addition, the power stage circuit can also include primary leakage inductor Lpk in the primary side and secondary leakage inductor Lsk in the secondary side. The power stage circuit can obtain the output voltage information of the power stage circuit, a current zero-crossing moment, and the current valley moment of secondary winding Ls, through an auxiliary winding and other methods. In addition, based on the above information, primary power switch M1 can be controlled in order to obtain an output voltage or an output current that meets the demand.

Due to the existence of secondary leakage inductor Lsk in the secondary side, secondary diode D2 or the synchronous rectifier circuit in the secondary side may bear a higher reverse spike voltage, and the EMI performance of the switching power supply may deteriorate. In this way, a diode with a higher withstand voltage in the secondary side may be chosen, which may sacrifice efficiency and increase cost. For the solution with an RC buffer circuit above, the presence of resistor R2 may dampen the series resonance of secondary leakage inductor Lsk in the secondary side, which can effectively reduce the spike voltage caused by secondary leakage inductor Lsk. However, resistor R2 may increase power consumption and reduce efficiency.

In particular embodiments, a buffer circuit can include a capacitive element. The capacitive element can be configured to be charged by output capacitor Cout when primary power switch M1 is turned on. When primary power switch M1 is turned off, the capacitive element can be discharged through secondary winding Ls of the transformer. This can reduce the energy stored in the primary leakage inductor in the primary side, thereby reducing the spike voltage in the secondary side and improving the efficiency of the flyback converter. In particular embodiments, the buffer circuit can connect in parallel at both terminals of secondary diode D2 or the synchronous rectifier circuit. The capacitive element in the buffer circuit may resonate with secondary leakage inductor Lsk in the secondary side, and a discharge current path where the capacitive element is located may not pass through a resistive element.

In one embodiment, the buffer circuit can only include the capacitive element. Here, the capacitive element can be configured as buffer capacitor C2, and buffer capacitor C2 can be directly connected in parallel with a secondary diode or a synchronous rectifier switch in the synchronous rectifier circuit, as shown. When primary power switch M1 is turned on, the voltage at node A may drop, synchronous rectifier circuit 20 can be disabled, and buffer capacitor C2 may be charged by output capacitor Cout. The charge current path is shown by the solid arrow in FIG. 2. When primary power switch M1 is turned off, the voltage at node A may rise, and buffer capacitor C2 can discharge to output capacitor Cout. The discharge current path is shown by the dotted arrow in FIG. 2.

For example, there can be the following operating states in chronological order. In the first operating state, the voltage at node LX in the primary side may rise from 0V, and the voltage at node A in the secondary side may rise from ($-Vbus*Ns/Np$), where Vbus is the DC bus voltage, and Ns/Np is the turns ratio of the secondary and primary windings of transformer T. In this way, a primary current can flow through primary winding Lp, node LX and a parasitic capacitor to the primary reference ground. Buffer capacitor C2 may begin to discharge by a discharge current, and the discharge current path is shown by the dashed arrow in FIG. 2. The discharge current of buffer capacitor C2 may flow through secondary winding Ls, and a excitation current of transformer T in the primary side can be coupled to secondary winding Ls when secondary winding Ls is reverse biased, such that an excitation current flowing through secondary winding Ls can be generated. In this process, there may be no resistive element in the discharge current path of buffer capacitor C2, and the discharge current of buffer capacitor C2 can be equal to the excitation current flowing through secondary winding Ls, such that the excitation current flowing through secondary winding Ls is larger due to the discharge current of buffer capacitor C2, thereby reducing the loss generated by the primary leakage inductor in the primary side. In addition, as compared with other approaches, no heat loss of the buffer resistor can be generated, and the efficiency can accordingly be improved.

In the second operating state, the voltage at node LX may rise to Vbus+Vor, the voltage at node A may rise to Vo+Vf, and reflected voltage Vor can be generated in the secondary side. Here, the reflected voltage Vor=(Vo+Vf)*Np/Ns, where Vf is the forward voltage drop of the secondary diode. In this way, the voltage across secondary winding Ls having been established, DC bus voltage Vbus in primary side of transformer T may no longer generate the excitation current, and the magnetic field energy (e.g., the excitation current) of transformer T can continue to charge the parasitic capacitor at node LX. Further, the voltage at node LX may continue to rise, and a secondary current in the secondary side of transformer T can charge output capacitor Cout through rectifier circuit 20.

In the third operating state, the voltage at node LX may rise to Vclamp, where Vclamp is a clamp voltage that is a voltage between the cathode of diode D1 and the primary reference ground. In this way, diode D1, capacitor C1, and resistor R1 may form a buffer circuit in the primary side. When diode D1 is forward conducting, the primary current can flow through primary winding Lp, primary leakage inductor Lpk, node LX, diode D1, and capacitor C1 to DC bus voltage Vbus. A voltage across primary winding Lp can be clamped to reflected voltage Vor during secondary winding Ls is turned on, a voltage across primary leakage inductor Lpk may be Vclamp-Vbus-Vor, and the energy in primary leakage inductor Lpk can begin to be stored in capacitor C1. The excitation current can charge output capacitor Cout through rectifier circuit 20.

In the fourth operating state, the primary current flowing through primary leakage inductor Lpk may drop to zero, and the excitation current in the primary side of transformer T may drop to zero. In this way, diode D1 may have reverse recovery time Trr, and diode D1 can remain turned on during reverse recovery time Trr. Further, clamp voltage Vclamp>Vbus+Vor, and capacitor C1 may begin to discharge to primary leakage inductor Lpk and primary winding Lp. When the discharge current of capacitor C1 flows through primary winding Lp, transformer T can be in the forward mode, the energy may be transmitted to secondary winding Ls, and output capacitor Cout can be charged through rectifier circuit 20.

In the fifth operating state, after reverse recovery time Trr of diode D1 ends, the primary current may return to zero. In this way, transformer T can complete the transition state, and the excitation current may be passed to secondary winding Ls. In this example, buffer capacitor C2 can be charged by output capacitor Cout when primary power switch M1 is turned on, and may be discharged to output capacitor Cout when primary power switch M1 is turned off. In the first operating state, when buffer capacitor C2 is discharged, the discharge current may flow through secondary winding Ls. Since the discharge current may not pass through the resistive element, more of the excitation current can be brought to secondary winding Ls, thereby reducing the energy stored in primary leakage inductor Lpk, and improving the efficiency.

Figure 3:
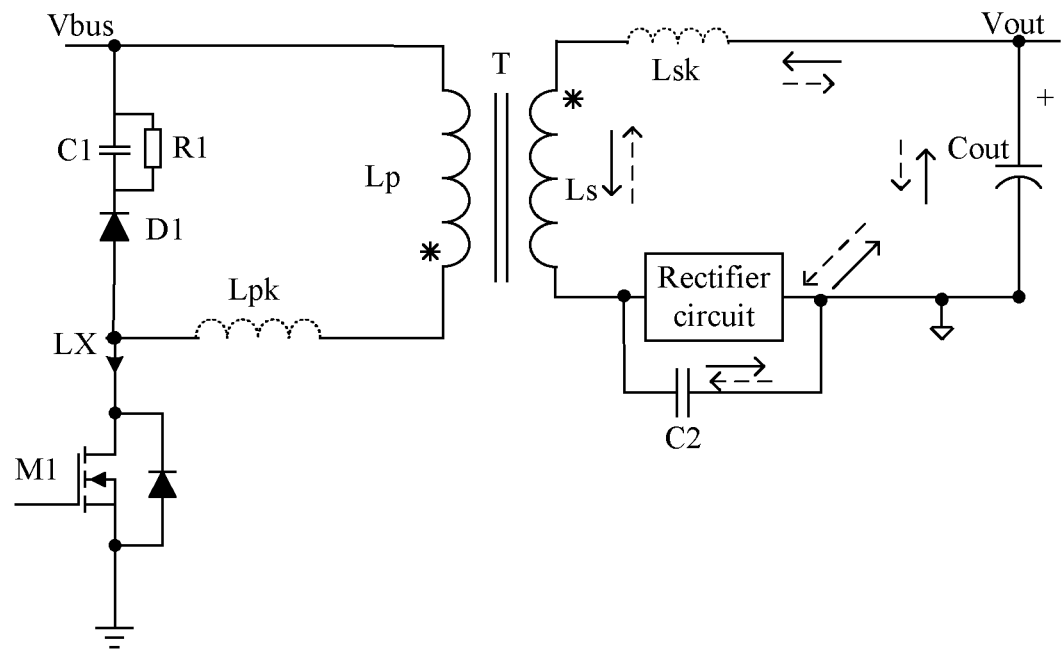
FIG. 3 is a schematic block diagram of a second example buffer circuit for a switching power supply, in accordance with embodiments of the present invention.

Referring now to FIG. 3, shown is a schematic block diagram of a second example buffer circuit for a switching power supply, in accordance with embodiments of the present invention. In this particular example, the rectifier circuit can connect between one terminal of secondary winding Ls and a secondary reference ground. That is, the rectifier circuit can connect to the low potential terminal of the secondary side, which may simplify a driving circuit for the synchronous rectifier switch in the rectifier circuit.

Figure 4:
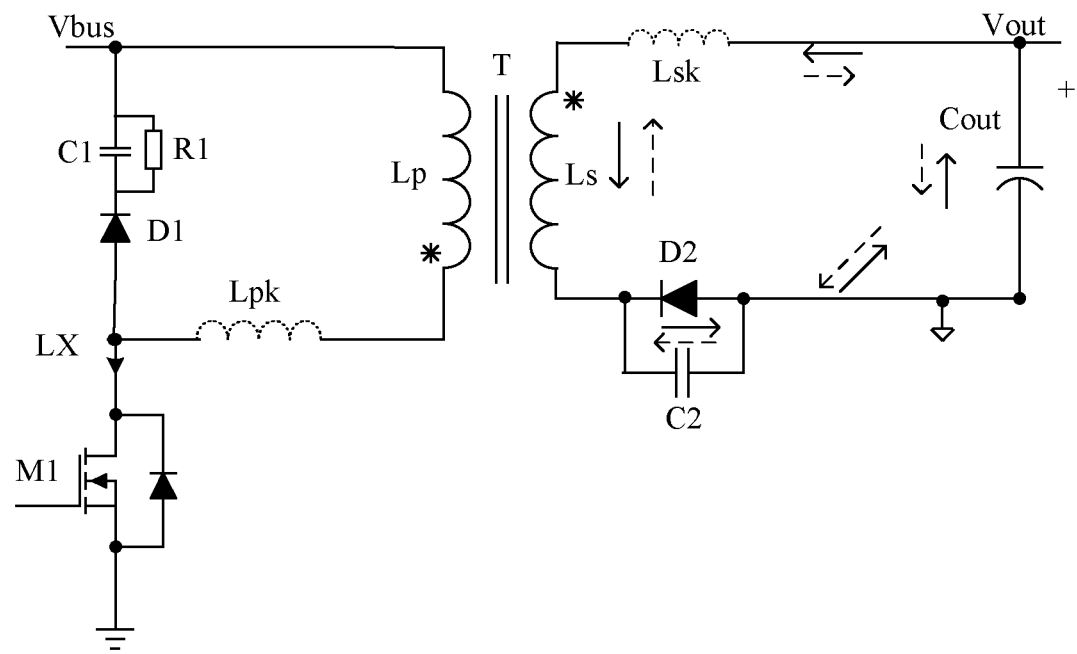
FIG. 4 is a schematic block diagram of a third example buffer circuit for a switching power supply, in accordance with embodiments of the present invention.

Referring now to FIG. 4, shown is a schematic block diagram of a third example buffer circuit for a switching power supply, in accordance with embodiments of the present invention. In this particular example, the rectifier circuit can be configured as secondary diode D2.

Figure 5:
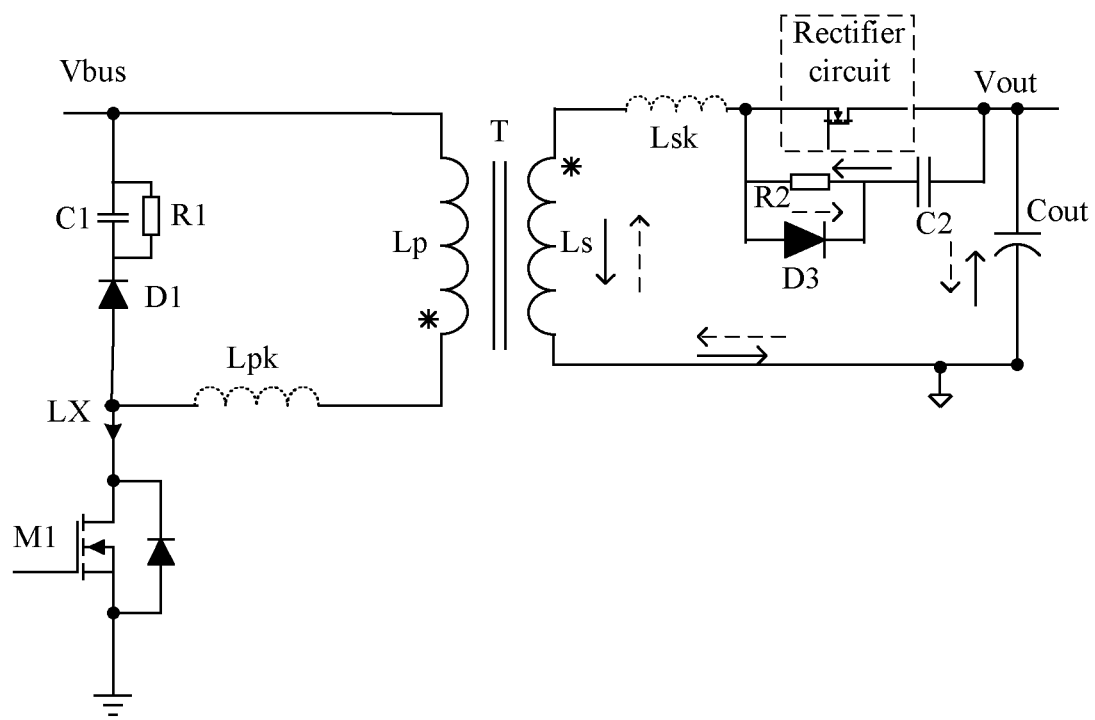
FIG. 5 is a schematic block diagram of a fourth example buffer circuit for a switching power supply, in accordance with embodiments of the present invention.

Referring now to FIG. 5, shown is a schematic block diagram of a fourth example buffer circuit for a switching power supply, in accordance with embodiments of the present invention. This particular example buffer circuit can include a capacitive element, buffer resistor R2, and buffer diode D3. In this example, the capacitive element can be configured as buffer capacitor C2. A parallel-connection of buffer resistor R2 and buffer diode D3 can connect in series with buffer capacitor C2. In this example, buffer diode D3 can be configured as a fast recovery diode. Further, when the rectifier circuit is configured as a synchronous rectifier circuit, a synchronous rectifier switch in the synchronous rectifier circuit may have a source terminal connected to secondary winding Ls, and a drain terminal connected to the high potential terminal of output voltage Vout. Buffer resistor R2 and the anode of buffer diode D3 can be commonly connected to the source terminal of the synchronous rectifier switch. Buffer resistor R2 and the cathode of buffer diode D3 can be commonly connected to a first terminal of buffer capacitor C2. A second terminal of buffer capacitor C2 can connect to the drain terminal of the synchronous rectifier switch. In this way, the charging current of buffer capacitor C2 may pass through buffer resistor R2, and the discharge current of buffer capacitor C2 may not pass through buffer resistor R2, since buffer resistor R2 is effectively short-circuited through buffer diode D3.

Regarding the spike voltage generated by the secondary leakage inductor in the secondary side of the transformer, some approaches utilize the RC buffer circuit. That is, buffer resistor R2 and buffer capacitor C2 may perform the function of buffering and dampening the series resonance, in order to buffer the spike voltage. However, buffer resistor R2 in such an approach is connected in series with the charge and discharge current paths of capacitor C2, which can sacrifice efficiency. In particular embodiments, the buffer circuit can include buffer diode D3 connected in parallel with buffer resistor R2 in the secondary side, as shown in FIG. 5. The buffer circuit may not only perform the function of buffering and dampening the series resonance, but can also optimize the efficiency. Further, when buffer capacitor C2 is charged, buffer diode D3 may not conduct in the reverse direction, which may not impact the damping effect. When buffer capacitor C2 is discharged, buffer diode D3 can be forwardly conducted, and buffer resistor R2 may be short-circuited, such that due to the discharge current of buffer capacitor C2, the excitation current coupled to secondary winding Ls is larger, and the loss generated by the primary leakage inductor in the primary side is smaller. In addition, buffer resistor R2 can be short-circuited by buffer diode D3, which may also reduce the heat loss, such that the efficiency can be improved.

Figure 6:
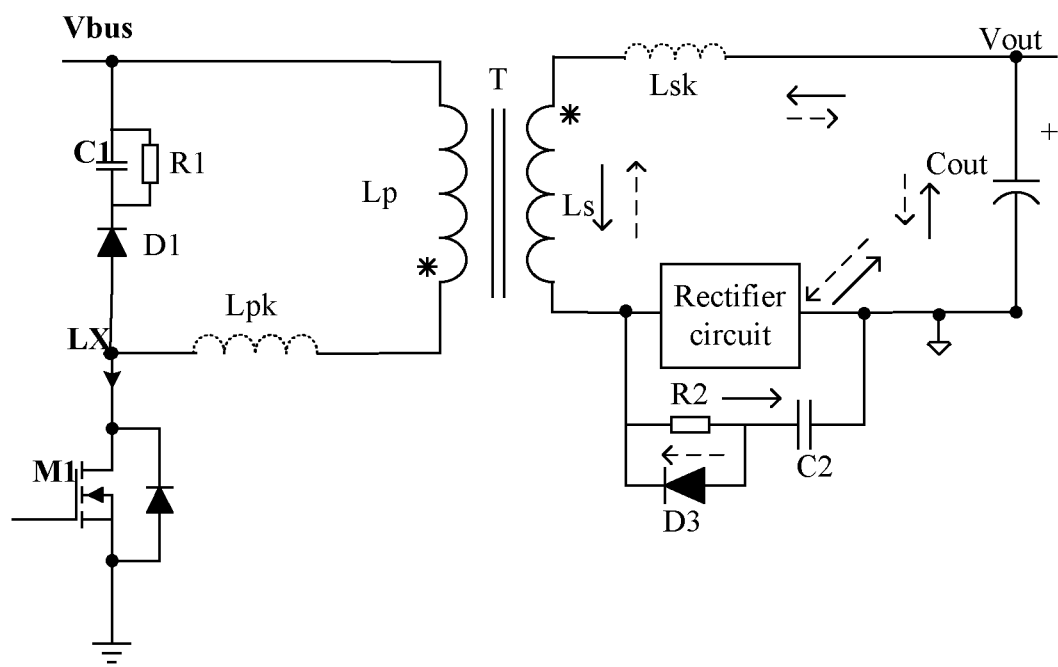
FIG. 6 is a schematic block diagram of a fifth example buffer circuit for a switching power supply, in accordance with embodiments of the present invention.

Referring now to FIG. 6, shown is a schematic block diagram of a fifth example buffer circuit for a switching power supply, in accordance with embodiments of the present invention. In this particular example, the rectifier circuit can connect between one terminal of secondary winding Ls and the secondary reference ground. That is, the rectifier circuit can connect to the low potential terminal of the secondary side.

Figure 7:
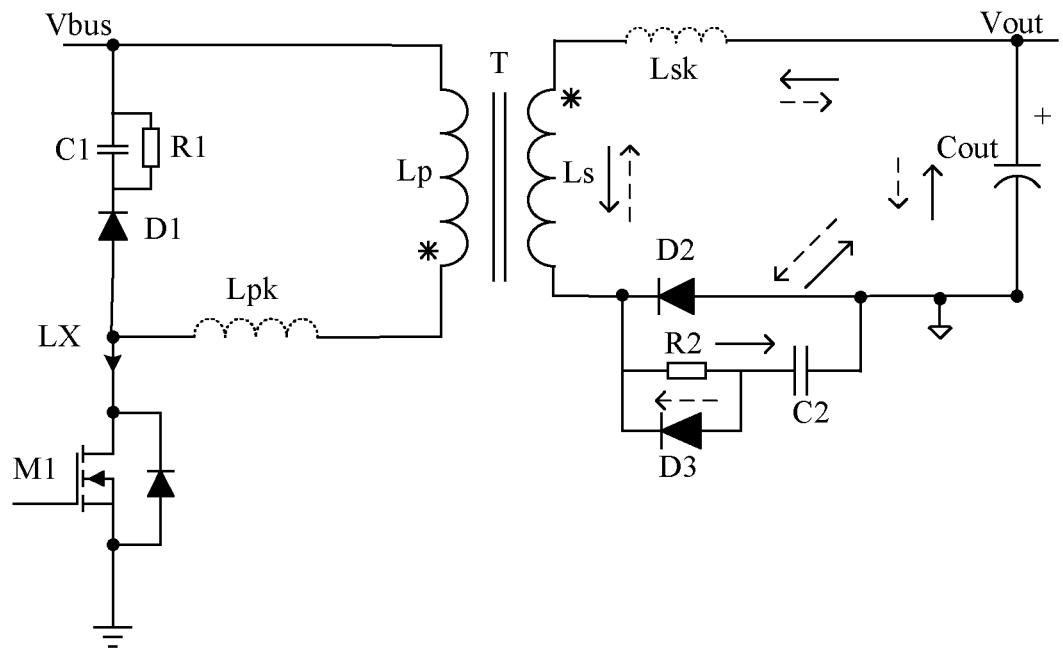
FIG. 7 is a schematic block diagram of a sixth example buffer circuit for a switching power supply, in accordance with embodiments of the present invention.

Referring now to FIG. 7, shown is a schematic block diagram of a sixth example buffer circuit for a switching power supply, in accordance with embodiments of the present invention. In this particular example, the synchronous rectifier circuit can be replaced by secondary diode D2, and secondary diode D2 may also connect between one terminal of secondary winding Ls and the secondary reference ground. Here, the conduction direction of buffer diode D3 can be the same as that of secondary diode D2. Further, the anode of buffer diode D3 can be directly connected to the anode of secondary diode D2, or the cathode of buffer diode D3 can be directly connected to the cathode of secondary diode D2. In this example, buffer resistor R2 and the cathode of buffer diode D3 can be commonly connected to the cathode of secondary diode D2. Also, buffer resistor R2 and the anode of buffer diode D3 can be commonly connected to one terminal of buffer capacitor C2, and the other terminal of buffer capacitor C2 can connect to the anode of secondary diode D2.

Figure 8:
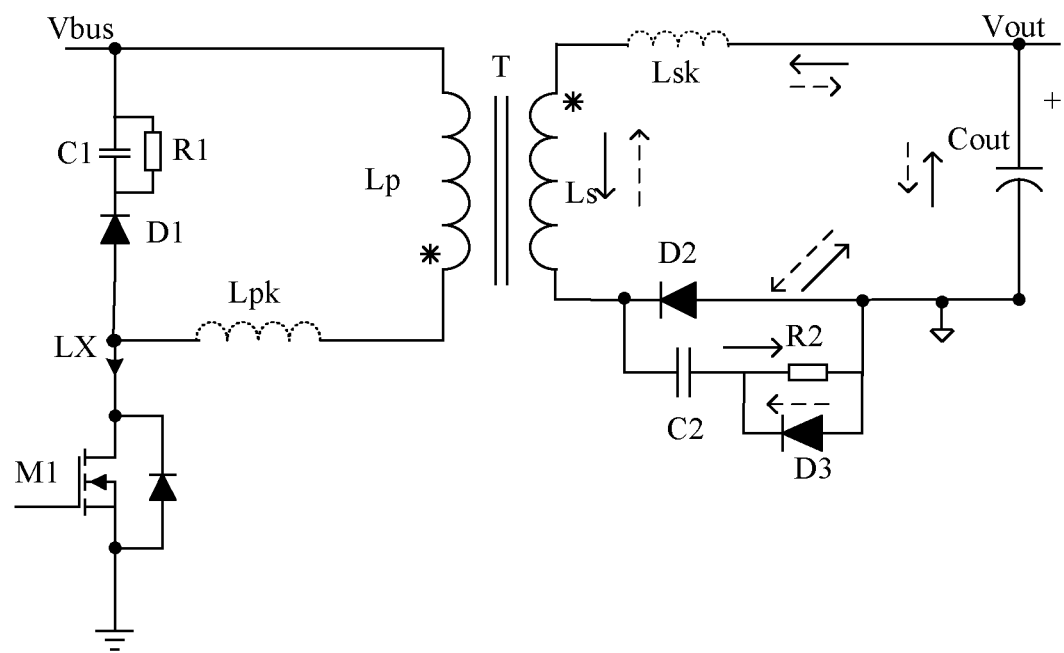
FIG. 8 is a schematic block diagram of a seventh example buffer circuit for a switching power supply, in accordance with embodiments of the present invention.

Referring now to FIG. 8, shown is a schematic block diagram of a seventh example buffer circuit for a switching power supply, in accordance with embodiments of the present invention. In this particular example, the positional relationship of the various elements of the buffer circuit has been changed. Further, the parallel-connection of buffer capacitor C2 and buffer diode D3 in the buffer circuit in this example is connected to the anode of secondary diode D2. It should be understood that this change may not affect the operation of the buffer circuit, only the order in which the charging and discharging current of the buffer capacitor flows through the elements has been changed.

Figure 9:
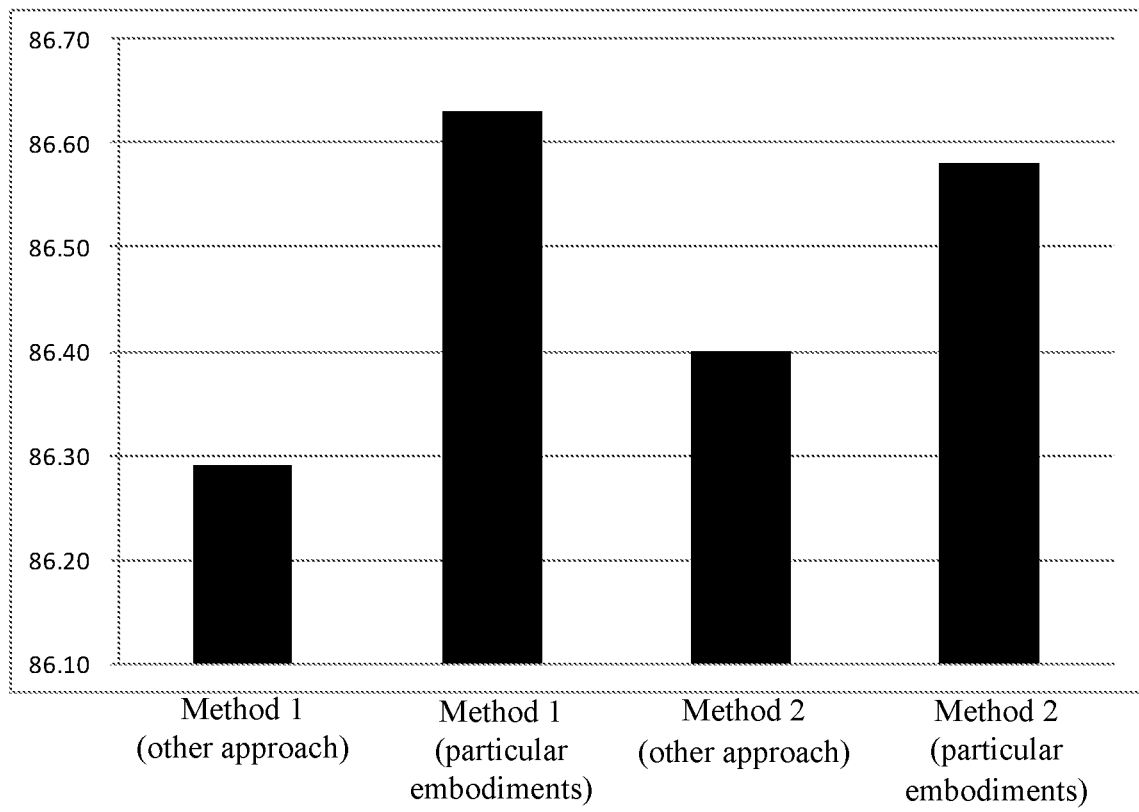
FIG. 9 is a comparison table of efficiency between particular embodiments and other approaches, in accordance with embodiments of the present invention.

Referring now to FIG. 9, shown is a comparison table of efficiency between particular embodiments and other approaches, in accordance with embodiments of the present invention. For example, method 1 in the other approach may adopt a diode or a synchronous rectifier switch with higher reverse withstand voltage, and method 2 in the other approach may provide an RC circuit connected in parallel to the secondary side to buffer the spike voltage generated by the leakage inductor. It can be seen that the paralleled RC circuit in the other approach improve the efficiency to a certain extent, but the series-connected resistor may increase power consumption, resulting in insignificant improvement in efficiency. In one embodiment, a buffer capacitor can be directly connected in parallel to the rectifier circuit, a part of the excitation current can be coupled to the secondary side through the discharge and charge currents of the buffer capacitor, and the energy stored in the leakage inductor in the primary side may be reduced, thereby improving the efficiency. In another embodiment, a buffer diode can be connected in parallel with a buffer resistor, and may replace the RC buffer circuit in the secondary side with an RCD buffer circuit, which may not only buffer the spike voltage, but also reduce the loss of the series resistor and improve the conversion efficiency of the power supply.

In particular embodiments, the buffer circuit in the secondary side may reduce the loss by making the discharge current of the buffer capacitor no longer pass through the buffer resistor. Further, the buffer capacitor can be directly connected in parallel with the rectifier circuit, or the buffer diode can be connected in parallel with the buffer resistor. In this way, the series buffer resistor may not only dampen the resonance of the leakage inductor and reduce the spike voltage, but can also dampen a resonance due to the existence of the buffer diode when the buffer capacitor is charged and the buffer diode does not conduct in the reverse direction. When the buffer capacitor is discharged, the diode buffer can be forward-conducted, such that the buffer resistor is effectively short-circuited, and the discharge current of the buffer capacitor and the excitation current of the transformer may no longer pass through the buffer resistor, thereby improving efficiency.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A buffer circuit coupled in parallel to a rectifier circuit in a secondary side of a flyback converter, the buffer circuit comprising:

a) a capacitive element configured to be charged by an output capacitor when a primary power switch in the flyback converter is turned on;
b) the capacitive element being configured to be discharged through a secondary winding of a transformer when the primary power switch is turned off, in order to reduce energy stored in a primary leakage inductor in a primary side of the flyback converter, whereby a spike voltage generated in a secondary leakage inductor in the secondary side is reduced, and efficiency of the flyback converter is improved; and
c) a parallel-connection of a buffer resistor and a buffer diode coupled in series to the capacitive element, wherein the rectifier circuit comprises a synchronous rectifier circuit, and wherein an anode of the buffer diode is coupled to a source terminal of a synchronous rectifier switch in the synchronous rectifier circuit.

2. The buffer circuit of claim 1, wherein the capacitive element and the secondary leakage inductor in the secondary side resonate, and a discharge current path comprising the capacitive element does not pass through a resistive element.

3. The buffer circuit of claim 2, wherein the capacitive element is coupled in parallel with the rectifier circuit.

4. The buffer circuit of claim 1, wherein a charge current of the capacitive element passes through the buffer resistor, and a discharge current of the capacitive device does not pass through the buffer resistor.

5. The buffer circuit of claim 4, wherein a cathode of the buffer diode is coupled to a drain terminal of the synchronous rectifier switch.

6. The buffer circuit of claim 1, wherein the buffer diode is configured as a fast recovery diode.

7. A switching power supply, comprising the buffer circuit of the claim 1, and further comprising a power stage circuit configured as the flyback converter.

* * * * *